July 4, 1961

H. METH ET AL 2,990,769

IMPRINTING MACHINE

Filed Feb. 26, 1959

INVENTORS
HARRY METH
HARRY J. HENDERLY
BY *Jugelter & Jugelter*
ATTORNEYS

July 4, 1961    H. METH ET AL    2,990,769
IMPRINTING MACHINE

Filed Feb. 26, 1959    3 Sheets-Sheet 2

INVENTORS
HARRY METH
HARRY J. HENDERLY
BY Jugelter & Jugelter
ATTORNEYS

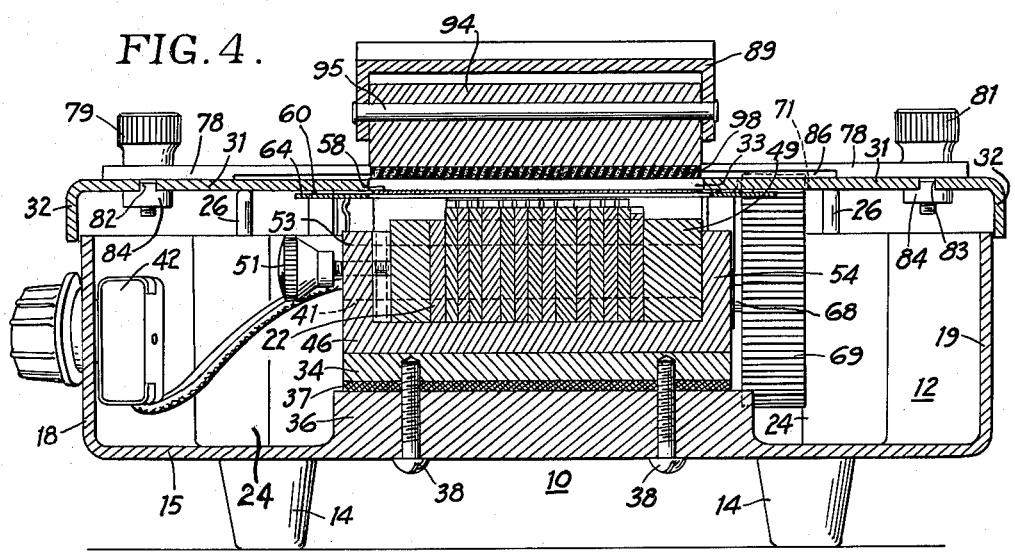
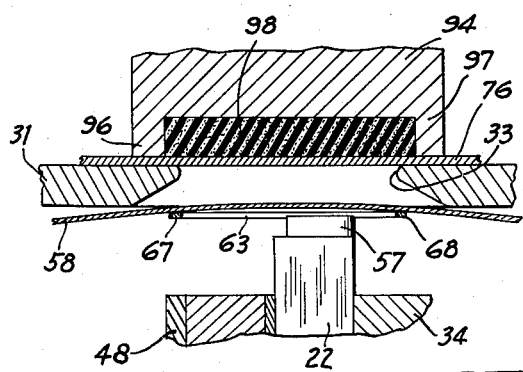
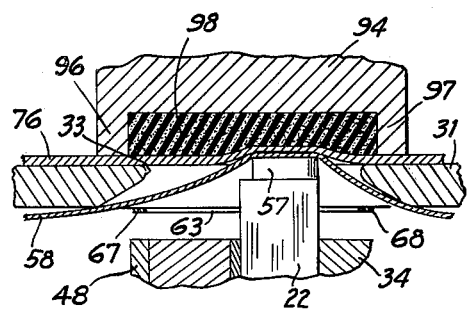
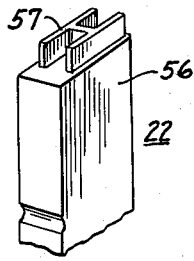
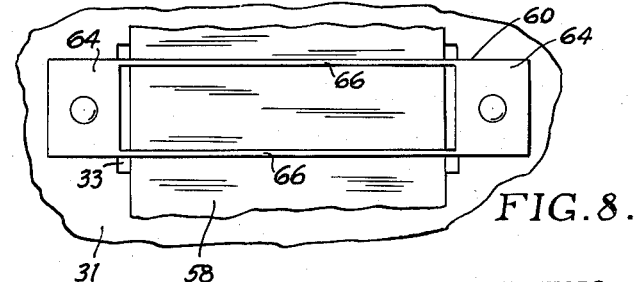

United States Patent Office 2,990,769
Patented July 4, 1961

2,990,769
IMPRINTING MACHINE
Harry Meth and Harry J. Henderly, Mariemont, Ohio, assignors to Concepts, Inc., Cincinnati, Ohio, a corporation of Ohio
Filed Feb. 26, 1959, Ser. No. 795,760
4 Claims. (Cl. 101—310)

This invention relates to a machine for imprinting or transferring a heat-transferrable coating from a web onto a sheet to be imprinted therewith.

An object of this invention is to provide an imprinting machine of this type having stationary heated type mounted on a base and a slotted table thereabove which can float up or down so that, when a sheet to be imprinted is mounted on the table above the slot thereof, the table and sheet can be pressed downwardly toward the type with the slot of the table being aligned with the type to cause the type to engage a web at the slot to transfer or print coating from the web onto the sheet.

A further object of this invention is to provide a machine of this type in which the web carrying a heat-transferrable coating is carried by the table and rides up and down therewith so that the web engages the type only when the table is pressed downwardly.

A further object of this invention is to provide a machine of this type which includes an operative handle pivotally mounted on the base and having a section which swings up and down above the table and carries a block which is registrable with the table at the edges of the slot for urging the table and the sheet to be imprinted downwardly toward the type.

A further object of this invention is to provide a machine of this type in which the table is mounted on spring pressed pins which urge the table upwardly toward a normal position in which the web is free of the type.

The above and other objects and features of the invention will be apparent to those skilled in the art to which this invention pertains from the following detailed description and the drawings, in which:

FIG. 4 is a view in section taken on the line 4—4 in FIG. 3;

FIG. 5 is an enlarged, fragmentary view in section taken on the same line as FIG. 3, showing a portion of a sheet to be imprinted before imprinting;

FIG. 6 is an enlarged, fragmentary view in section taken on the same line as FIG. 3, showing the sheet immediately after imprinting thereof;

FIG. 7 is a perspective view showing one of the type bars used in the machine;

FIG. 8 is a fragmentary, bottom plan view of the cover removed from the machine;

In the following detailed description, and the drawings, like reference characters indicate like parts.

Figure 1:
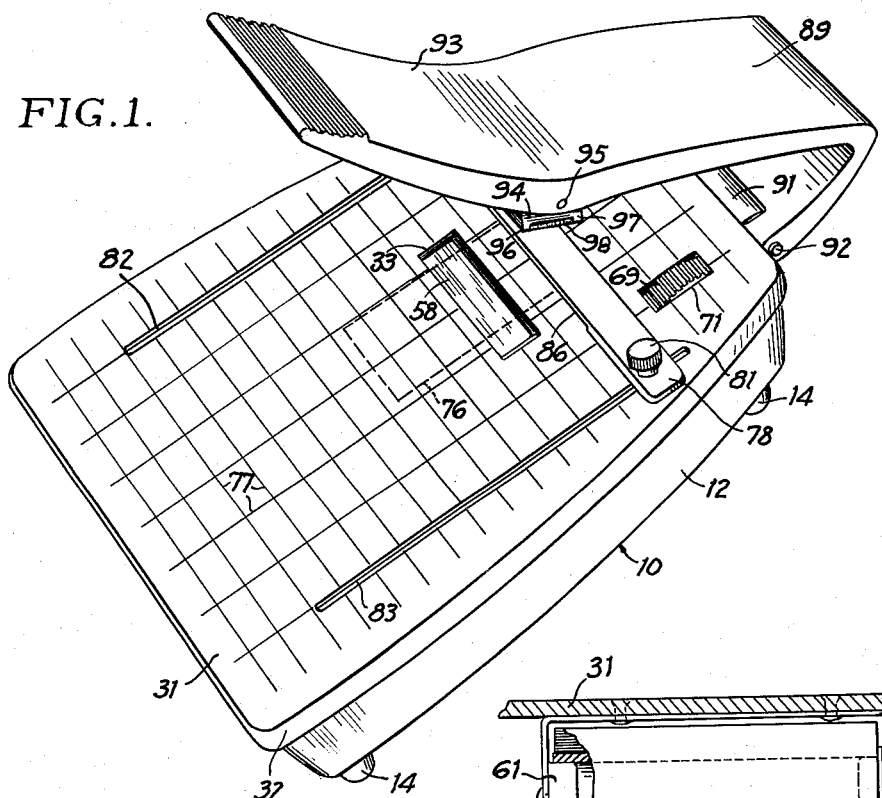
FIG. 1 is a perspective view showing an imprinting machine constructed in accordance with an embodiment of this invention, the location of a sheet to be imprinted thereby being indicated in dot-dash lines.
Figure 2:
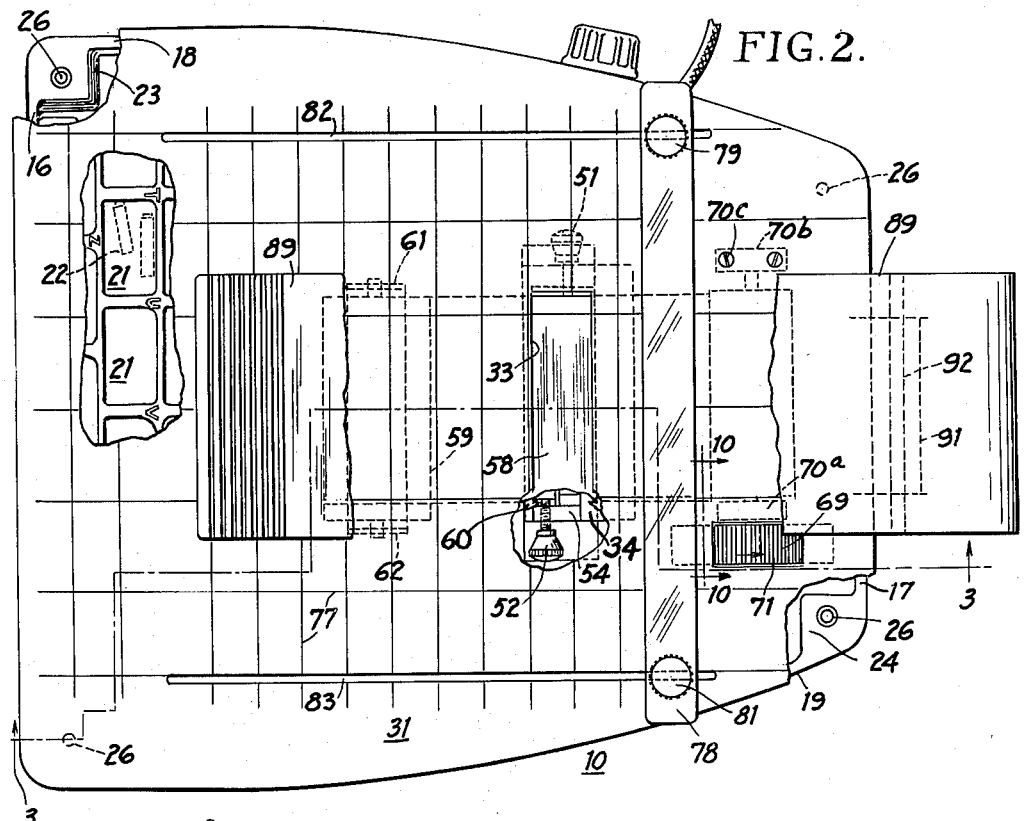
FIG. 2 is a plan view of the machine, parts being broken away to reveal interior structures.
Figure 3:
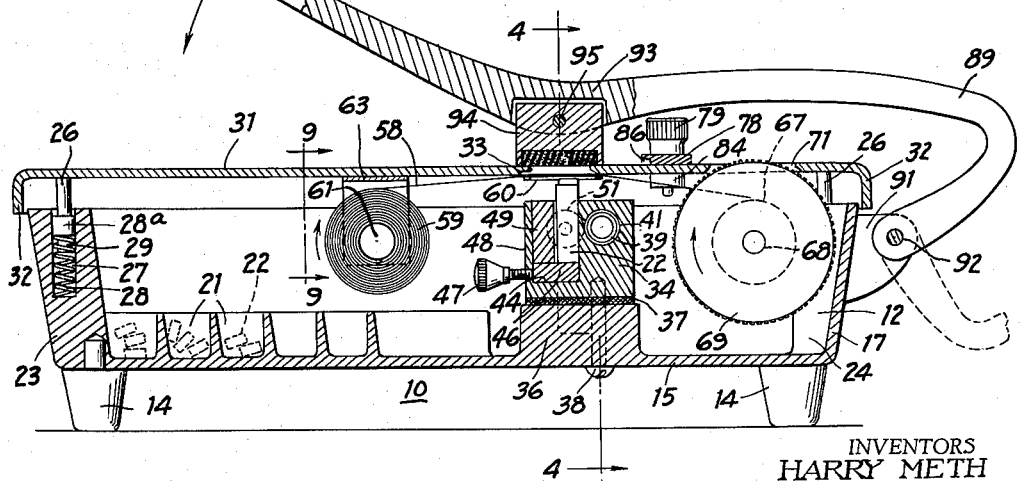
FIG. 3 is a view in section taken generally on the line 3—3 in FIG. 2.

An imprinting machine 10 constructed in accordance with an embodiment of this invention is shown in FIGS. 1–4, inclusive. The machine includes a base 12 (FIGS. 1, 3 and 4) which is mounted on legs 14. The base is generally box-shaped and includes a bottom 15 (FIGS. 3 and 4), end walls 16 and 17 (FIG. 2), and side walls 18 and 19 (FIG. 4). The top of the base is open. Bins 21 (FIGS. 2 and 3) are formed on the bottom to receive type bars 22. At the corners of the base are formed internal bosses 23 and 24 (FIGS. 2 and 3) in which spring-pressed pins 26 are mounted. Details of construction of one of the spring-pressed pins are shown in FIG. 3. The pin 26 is mounted in upright bore 27 in its boss 23. A compression spring 28 is mounted in the lower portion of the bore 27. The pin has a central, enlarged portion 28a which fits closely inside the bore and a lower extension 29 of reduced diameter which fits into the upper end of the compression spring 28. The upper end of the pin extends upwardly from the base.

A flat table or cover 31 (FIGS. 1 and 2) having a flat upper face is mounted above the base 12 and rests on the spring-pressed pins 26. The cover includes a downwardly extending peripheral flange 32 (FIG. 3) which extends just outside the walls of the base so that the flange 32 guides the cover for movement up and down. A main slot 33 is formed in the table 31, as shown in FIGS. 2 and 3. The slot 33 overlies a heated, type-holding block 34 (FIG. 3). The block 34 is mounted on a boss 36 which forms a portion of the base 12. A heat-insulating sheet 37 is mounted between the block 34 and the boss 36. Screws 38 hold the block 34 and the pad 37 in place on the boss 36. The block 34 is heated by an appropriate electric heating element 39 (FIG. 3) mounted in a bore 41 in the block. A switch 42 (FIG. 4) controls the heating element.

The type-holding block 34 is provided with a slot 44 (FIG. 3) in which a channel-shaped type-holder or stick 46 is received. The type holder 46 is held in place by a thumb screw 47 (FIG. 3) mounted in a front wall 48 of the block 34. As shown in FIG. 4, appropriate type bars 22 and spacers 49 are set up inside the type holder 46. The type bars and spacers are held in place therein by thumb screws 51 and 52 (FIG. 2). As shown in FIG. 4, the thumb screw 51 is mounted in an end flange 53 of the type-holder 46. The thumb screw 52 is similarly mounted in the opposite end flange 54. The type bars can be of standard form. One type bar is shown in FIG. 7 and includes a body 56 and a type face 57 of the usual form. The type bars are heated by the heated block surrounding them.

Figure 9:
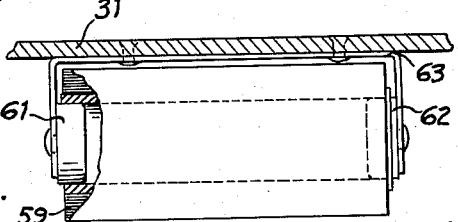
FIG. 9 is a fragmentary view in section taken on the line 9—9 in FIG. 3.
Figure 10:
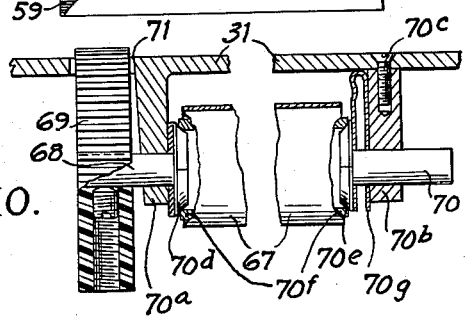
FIG. 10 is a fragmentary view in section taken on the line 10—10 in FIG. 2.

An elongated web 58 is guided above the heated block and the faces of the type bars. The web carries a coating of heat transferrable material. This coating can be metallic color, or can be of other colors, as is common in such webs. The web extends from a supply roll 59. The supply roll 59, as shown in FIG. 9, is rotatably mounted on lugs 61 and 62. The lugs 61 and 62 are mounted on the arms of an inverted, resilient, channel-shaped holder 63. The holder 63 is attached to the underside of the table 31. From the supply roll 59 the web passes above a guide 60 (FIGS. 3 and 8). As shown in FIG. 8, the guide 60 is attached to the underside of the cover in registry with the slot 33. The guide 60 includes end portions 64 which are attached to the table. Wire-like strips 66 span the end portions 64 and are spaced on opposite sides of the slot 33, as shown in FIGS. 5 and 6. From the guide 60 the web extends to a take-up roll 67 (FIGS. 2 and 10). The take-up roll 67 is mounted on a stub shaft 68 (FIG. 10), which carries a knurled knob 69 and on a second stub shaft 70 which is coaxial with the stub shaft 68. The stub shafts 68 and 70 are pivotally mounted in lugs 70a and 70b which extend downwardly from the underside of the table 31. The lug 70a is integral with the table 31, while the lug 70b is attached thereto by screws 70c. The stub shafts carry heads 70d and 70e which engage and grip opposite ends of a core 70f of the take-up roll 67. A spring 70g urges the head 70e firmly against the adjacent end of the core. The upper edge of the knurled knob 69 extends through a slot 71 (FIGS. 2 and 3) in the table, so that the knurled knob can readily be engaged for turning the shaft 68 to draw the web from the supply roll onto the take-up roll.

A sheet 76 to be imprinted can be mounted on top of the table 31, as indicated by the dot-dash showing in FIG. 1. Guide lines 77 are drawn on the top face of the table for use in properly aligning the sheet 76. A guide bar 78 is held in predetermined position by thumb screws 79 and 81 (FIG. 4). The thumb screws 79 and 81 move along slots 82 and 83, respectively, in the table. Nuts 84 on the thumb screws 79 and 81 can be drawn up for locking the thumb screws and guide bar in selected positions. As shown in FIG. 3, a groove 86 is formed in an edge of the guide bar 78 for receiving an edge of the sheet 76 (see FIG. 1).

When the sheet 76 has been mounted on the table and the type has been heated to an appropriate temperature, an operating handle 89 is swung downwardly and in a counterclockwise direction, as shown in FIG. 3. The handle 89 is pivotally mounted on a boss 91 which extends outwardly from the base 12. A bifurcated end of the handle 89 embraces the boss 91. A pivot pin 92, which extends through the bifurcation of the handle and through the boss 91, forms the pivot for the handle. The handle 89 is J-shaped and the handle 89 includes a main portion 93, which can swing up and down above the table 31. A pusher block 94 is pivotally mounted on the main portion of the handle by a pivot pin 95. The block 94 includes flanges 96 and 97 (FIGS. 5 and 6) which are adapted to register with the table at the edges of the slot 33. A resilient pad 98 of rubber, or the like, is disposed between the flanges 96 and 97. When the block 94 is urged downwardly from the FIG. 5 position to the FIG. 6 position, the flanges 96 and 97 grip the sheet 76 which is to be imprinted and hold the sheet against the cover 31. As the block 94 is advanced further downwardly, the table 31 moves downwardly until the web 58 is engaged by the heated type bars 22, and the sheet 76 and web 58 are pressed between the type bars 57 and the rubber pad 98 to print on sheet 76 whatever indicia are set up in the type bars. Then, when downward pressure of the block 94 is released, the spring pressed pins 26 (see FIG. 3) urge the table upwardly to the FIG. 5 position in which the guide 60 holds the web 58 spaced above the heated type bars. Then, the upper edge of the knurled knob 69 (FIG. 3) can be engaged to turn the knob and the shaft 68 to draw a new section of the coated web into registry with the slot 33, whereupon another imprinting operation can be done.

The imprinting machine illustrated in the drawings and described above is subject to structural modification without departing from the spirit and scope of the appended claims.

Having described our invention, what we claim as new and desire to secure by Letters Patent is:

1. An imprinting machine which comprises a base, upwardly facing type mounted on and attached to said base, a table mounted on said base for movement up and down above the base, there being a slot in the table aligned with the type, a web having a transferrable coating thereon, means mounted on the table for guiding the web under the table and in alignment with said slot and normally spaced below an upper face of the table, a pusher block mounted for up and down movement above the slot, said pusher block having a portion adapted to overlie the portion of the table adjacent the slot, and means resiliently urging the table upwardly to a position in which the web is spaced from the type, the pusher block being advanceable downwardly and being adapted to engage a sheet mounted on the upper face of the table overlying the slot to grip the sheet against the resiliently urged table and urge the sheet and table downwardly to a position where the sheet and web are gripped between the type and the pusher block to imprint indicia of the type on the sheet with the coating of the web, the resiliently urging means normally supporting the table at a raised position in which the web is spaced from the type when the table is released.

2. An imprinting machine which comprises a base, upwardly facing type mounted on and attached to said base, a table mounted on said base for movement up and down above the base, there being a slot in the table aligned with the type, a web having a transferrable coating thereon, means mounted on the table for guiding the web under the table and in alignment with said slot and normally spaced below an upper face of the table, a pusher block mounted for up and down movement above the slot, said pusher block having rigid flanges adapted to overlie opposite edges of the slot, a resilient pad mounted on the pusher block between the flanges and overlying the type, and means resiliently urging the table upwardly to a position in which the web is spaced from the type, the pusher block being advanceable downwardly, whereby the flanges are adapted to engage a sheet mounted on the upper face of the table overlying the slot to grip the sheet against the resiliently urged table at the edges of the slot and urge the sheet and table downwardly to a position where the sheet and web are gripped between the type and the resilient pad of the block to imprint indicia of the type on the sheet with the coating of the web, the resiliently urging means normally supporting the table at a raised position in which the web is spaced from the type when the table is released.

3. An imprinting machine which comprises a base, upwardly facing heated type mounted on and attached to said base, a table mounted on said base for movement up and down above the base, there being a slot in the table aligned with the type, a web having a transferrable coating thereon, means mounted on the table for guiding the web under the table and in alignment with said slot and normally spaced below an upper face of the table, an operative handle pivotally mounted on the base, said handle having a portion advanceable up and down above the slot, a pusher block pivotally mounted on the handle, said pusher block having flanges adapted to overlie opposite edges of the slot, a resilient pad mounted on the pusher block overlying the type, and means resiliently urging the table upwardly to a position in which the web is spaced from the type, the handle being advanceable downwardly, whereby the block is adapted to engage a sheet mounted on the upper face of the table overlying the slot to grip the sheet against the resiliently urged table at the edges of the slot and urge the sheet and cover downwardly to a position where the sheet and web are gripped between the type and the resilient pad of the block to imprint indicia of the type on the sheet with the coating of the web, the resiliently urging means normally supporting the table at a raised position in which the web is spaced from the type when the table is released.

4. An imprinting machine which comprises a base, an upwardly facing heated type holder mounted on and attached to said base, type bars removably mounted in said type holder, means for heating the type holder to heat the type bars, a table mounted on said base for movement up and down above the base, there being a slot in the table aligned with the type, a web having a transferrable coating thereon, means mounted on the table for guiding the web under the table and in alignment with said slot and normally spaced below an upper face of the table, an operative handle pivotally mounted on the base, said handle having a portion advanceable up and down above the slot, a pusher block pivotally mounted on the handle, said pusher block having rigid flanges adapted to overlie opposite edges of the slot, a resilient pad mounted on the pusher block between said flanges and overlying the type, and means resiliently urging the table upwardly to a position in which the web is spaced from the type, the handle being advanceable downwardly, whereby the flanges of the block are adapted to engage a sheet mounted on the upper face of the table overlying the slot to grip the sheet against the resiliently urged table at the edges of the slot and urge the sheet and cover downwardly to a position where the sheet and web are gripped between the type and the resilient pad of the block to imprint indicia of the type on the sheet with the coating of the web, the resiliently urging means normally supporting the table at a raised position in which the web is spaced from the type when the table is released.

References Cited in the file of this patent

UNITED STATES PATENTS

| | | |
|---|---|---|
| 227,295 | Poole et al. | May 4, 1880 |
| 684,989 | Hostetler | Oct. 22, 1901 |
| 1,292,850 | Moss | Jan. 28, 1919 |
| 1,919,219 | Hoffman | July 25, 1933 |
| 2,301,010 | Boutiette | Nov. 3, 1942 |
| 2,531,539 | Smith | Nov. 28, 1950 |

FOREIGN PATENTS

| | | |
|---|---|---|
| 541,173 | Great Britain | Nov. 17, 1941 |